United States Patent

Andoh et al.

[11] Patent Number: 6,125,459
[45] Date of Patent: Sep. 26, 2000

[54] INFORMATION STORING METHOD, INFORMATION STORING UNIT, AND DISK DRIVE

[75] Inventors: Haruo Andoh, Zama; Keiji Kobayashi, Fujisawa; Kazunari Tsuchimoto, Sagamihara, all of Japan

[73] Assignee: International Business Machines Company, Armonk, N.Y.

[21] Appl. No.: 09/012,360

[22] Filed: Jan. 23, 1998

[30]     Foreign Application Priority Data

Jan. 24, 1997   [JP]   Japan ................................. 9-011040

[51] Int. Cl.[7] ........................................................ G06F 11/07
[52] U.S. Cl. ............................................. 714/55; 711/161
[58] Field of Search ....................... 714/51, 55; 711/161

[56]              References Cited

U.S. PATENT DOCUMENTS 3,566,368   2/1971   De Blauw ................................. 714/51
3,783,256   1/1974   Caputo et al. ........................ 714/55 X
3,908,117   9/1975   Naruse et al. ............................ 714/55
5,012,435   4/1991   Bailey et al. ............................. 714/55
5,278,976   1/1994   Wu ............................................ 714/55
5,341,497   8/1994   Younger ................................ 714/55 X
5,398,332   3/1995   Komoda et al. .......................... 714/55
5,513,319   4/1996   Finch et al. .............................. 714/55
5,644,709   7/1997   Austin .................................. 714/55 X
5,761,414   6/1998   Akaishi et al. ........................... 714/55
5,812,752   9/1998   Yamada ................................ 714/55 X

*Primary Examiner*—David L. Robertson
*Attorney, Agent, or Firm*—Esther Klein; Abdy Raissinia

[57]                ABSTRACT

Even in the case of a full hang state where a command to reset software is entirely ineffective, memory dump can be stored even if there is no in-circuit emulator. An HDD itself monitors a command execution time, that is, the time between reception of a command from a host computer and completion of the process of the command. If the HDD judges that it has taken an abnormally long time, a memory dump will be automatically stored on a reserved area on a disk. The memory dump can be read out from the disk at any time so that an analysis can be made.

6 Claims, 3 Drawing Sheets

INFORMATION STORING METHOD, INFORMATION STORING UNIT, AND DISK DRIVE

FIELD OF THE INVENTION

The present invention relates to an information storing method, an information storing unit, and a disk drive which stores information stored in a volatile memory on nonvolatie storage means. More specifically, the present invention is able to store the information stored in a volatile memory on nonvolatile storage means based on the occurrence of certain conditions.

DESCRIPTION OF THE RELATED ART

Hard-disk drives (HDDs) are equipped with a hard-disk controller (HDC) and a microprocessor unit (MPU). Based on commands from a host computer such as a personal computer, the HDC and MPU operate independent of the host computer and control write and read back operation on the magnetic disk, input/output commands and data to and from the host computer.

There are cases where the HDC and MPU of the HDD do not respond to the host computer control. This situations are also known as the HDD hung up. In such a case, in order to investigate the cause of the hang stage, sometimes it is desired to store the content of memory that the HDC and MPU use. This is also known as the memory dump.

In background art, memory dump can be stored on a reserved area on the disk by an external command through an interface.

PROBLEMS TO BE SOLVED BY THE INVENTION

However, in the case of a full hang stage of the HDD where an external command to reset software is entirely ineffective, an external command through an interface, such as that described above, cannot instruct storage of information in memory. In such a state, in the case where it is desired to know the content of memory, the only method is to change the control board of the HDD mounted with the HDC and MPU to a control board equipped with an MPU connected to an in-circuit emulator (ICE), operate the HDD and wait for regeneration of a similar hang stage, and read the content of the memory during the hang stage.

In the case where a similar hang state is reproduced, the memory content is read out by the ICE. To achieve this, exclusive hardware (such as a personal computer and a set of peripheral equipment) for making a connection to the ICE is required. However, in some cases the exclusive hardware cannot be used because of physical and other limitations. Even when the exclusive hardware can be used, it must be connected to the ICE to reproduce a similar hang state. Furthermore, in the case where the control board itself is malfunctioning, a similar hang state may not be reproduced by replacing the control board with a new control board.

Accordingly, it is an object of the present invention to provide an information storing method, an information storing unit, and a disk drive which are capable of easily making an analysis of the cause of a hang state even in the case of the full hang state where an external command through an interface is entirely ineffective.

SUMMARY OF THE INVENTION

An information storing method according to the present invention is provided for at least one unit which performs write and read back operations on a storage medium. The method comprises the steps of: monitoring the time taken for executing a command received from external equipment and storing the information used during the operation of the unit present in the volatile memory in a nonvolatile storage if the execution time of the command exceeds a predetermined time.

In an information storing system according to the present invention, at least one unit which performs write and read back operations on a storage medium comprises: means for monitoring the time taken for executing a command received from external equipment and means for storing the information used during the operation of the unit that present in the volatile memory in the nonvolatile storage if the execution time of the command exceeds a predetermined time.

A disk drive according to the present invention comprises: (a) a disk-shaped storage medium; (b) at least one read/write unit for performing read or write on the disk-shaped storage medium; (c) a control unit for controlling the write and read back operations which is performed by the read/write unit, based on a command received from an external unit; (d) volatile memory that the control unit uses during operation; (e) means for monitoring execution time of the command which is performed by the control unit; and (f) means for storing information present in the volatile memory on nonvolatile storage if the execution time of the command exceeds a predetermined time.

DESCRIPTION OF THE PREFERRED EMBODIMENT

Figure 1:
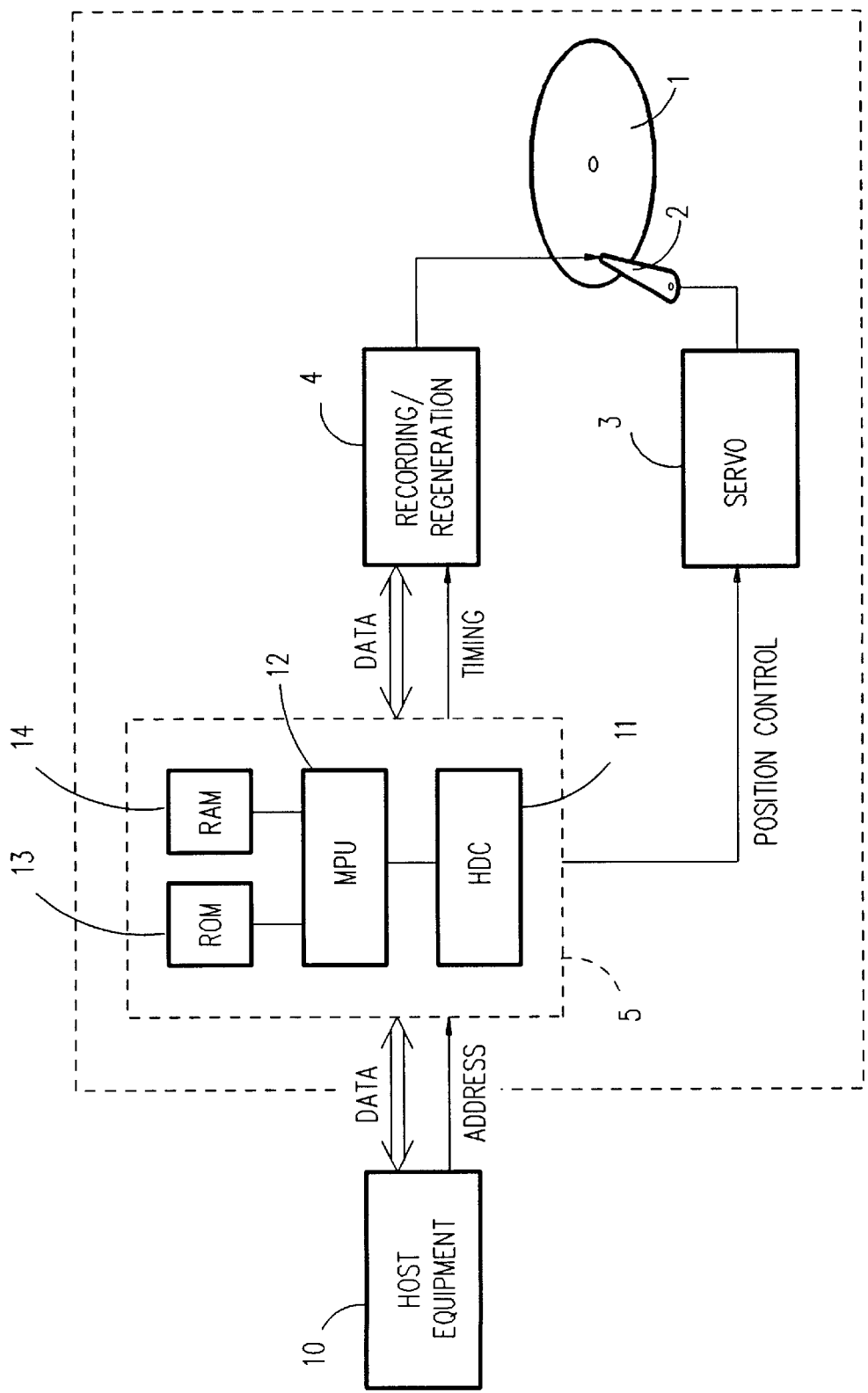
FIG. 1 is a block diagram showing a disk drive according to the present invention.

FIG. 1 is a block diagram in which a disk drive according to a preferred embodiment of the present invention is shown.

The disk drive is equipped with a magnetic disk 1 for recording data, a head 2 for performing data read and write on the magnetic disk 1, a servo system 3 for controlling the position of the head 2, a read/write system 4 for controlling the data read and write that are performed by the head 2, and a control section 5 for performing the servo control and the data read/write control and controlling data input and output between it and host equipment 10.

The control section 5 is equipped with an HDC 11 for executing servo control, an MPU 12 for executing computation of servo data for the servo control and a process such as an error process, a ROM 13 that includes microprograms and data for operating the MPU 12, and a RAM 14 on which data for servo control is recorded. Ram 14 may be used further as a cache.

Since ROM 13 is faster in operation than the RAM 14, the microprogram is stored in ROM 13. However, since the capacity of ROM 13 is limited, a portion of the microprogram which cannot be stored on the ROM 13 may be stored on a predetermined area on the magnetic disk 1. When power to the drive is turned on and the drive is reset (power-on reset (POR)), the microprogram may be read into the RAM 14 and executed.

In addition, it is desired to execute the microprogram from ROM 13 since ROM 13 is faster. However, because of the limitation in the capacity ROM 13, the microprogram may be compressed and stored in ROM 13. At the time of execution, the microprogram may be read into the RAM 14 and executed.

The control section 5 is constructed so that it can execute a plurality of tasks in parallel. One of the tasks is an arithmetic process for computing servo data which is executed each time a servo sector recorded on the magnetic disk 1 is read. In addition, the control section 5 controls the data input and output between it and the host equipment 10. It further controls the execution of the error task at the time of the error occurrence, a read cache task for reading ahead data that will be read out from the host equipment 10 and storing the read data in RAM 14, and a write cache task for writing the data stored in the RAM 14 on the magnetic disk 1.

During an error task, a retry with respect to an error during write and read back, allocation of an alternate sector if a retry cannot be made, and error notification in the case of no alternate sector, are executed.

When an unrecoverable error occurs or a malfunction of the MPU 12 occurs, there are cases where the operation of the disk drive is in a stopped state (hang state) when seen from the host equipment 10. For example, if the process of the MPU 12 enters an endless loop, the disk drive will enter into a hang state which does not respond to a command from the host equipment 10. Also, in cases where all data has been received from the host equipment 10 but because of an unexpected error the disk drive expects to receive more data, the disk drive enters and remains in a state which waits for reception of the remaining data. In this case, since the output of data from the host equipment 10 has ended, there will be no possibility that the disk drive will recover from the wait state. This situation is equivalent to a hang state.

Once the disk drive goes into a hang state, it must be restarted. There are instances where the content of the RAM 14 of the control section 5 is stored to investigate the cause of the hang state. In a case such as this, the prior art stores the content of the RAM 14 on a reserved area on the magnetic disk 1 by an external command through an interface.

However, in such a conventional method, since a command from the host equipment 10 must be supplied to instruct storage of the content of the RAM 14 and since the disk drive is in a full hang state where a command to reset software is entirely ineffective, the storage of the content of the RAM 14 cannot be instructed and achieved.

Execution of a command usually ends within a predetermined time. However, if the disk drive enters into a hang state, execution of a command will not end within a predetermined time. Therefore, if execution of a command is not completed within a predetermined time, there will be an extremely high possibility that the disk drive will be in the hang state. For this reason, in the disk drive itself, according to the present invention, the execution time of a command is monitored and if the command is not completed within a predetermined time, the disk drive will be considered to be in the hang state and the content of the RAM 14 will be stored.

Figure 2:
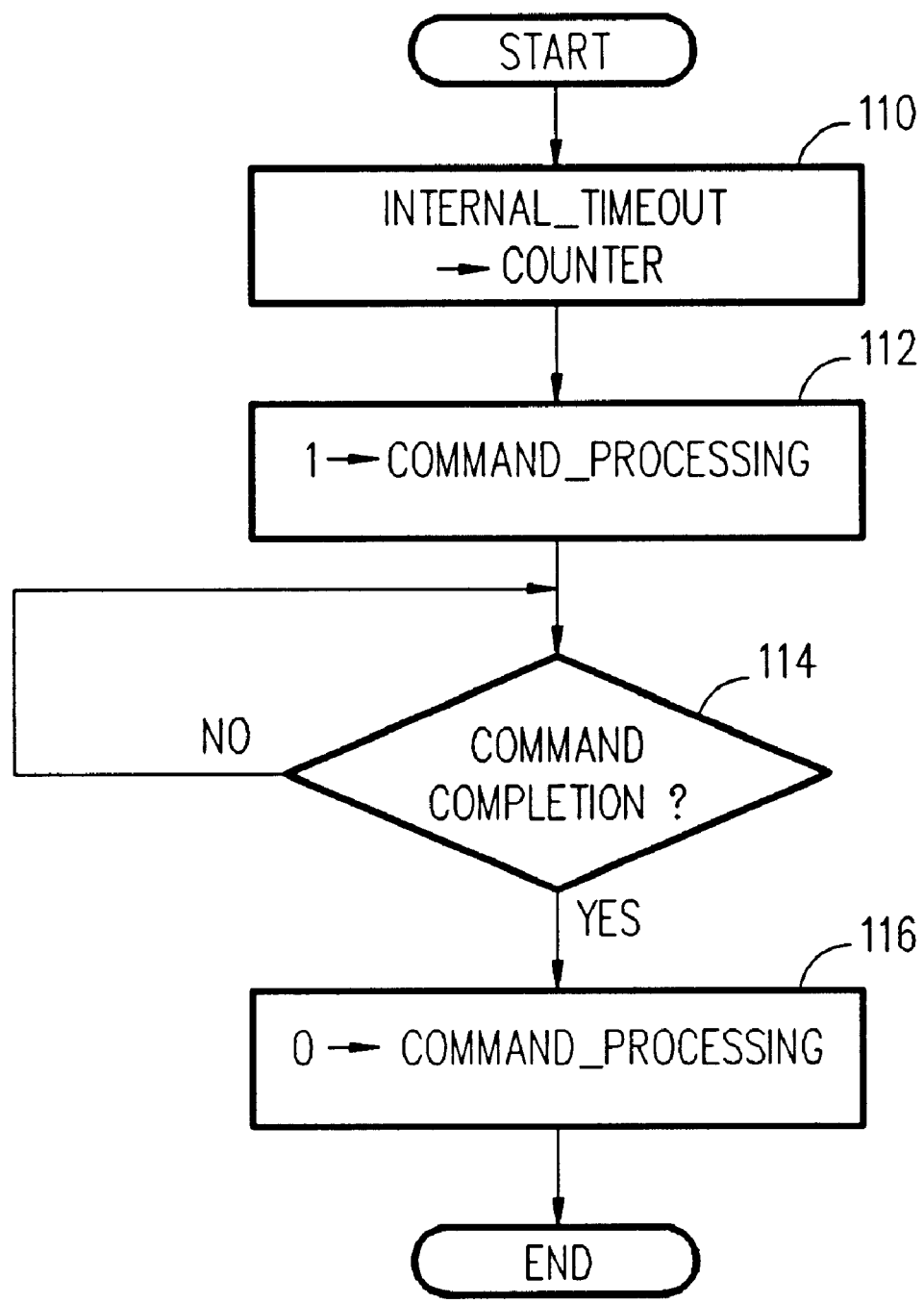
FIG. 2 is a flowchart showing a process for monitoring a command execution time according to the present invention.
Figure 3:
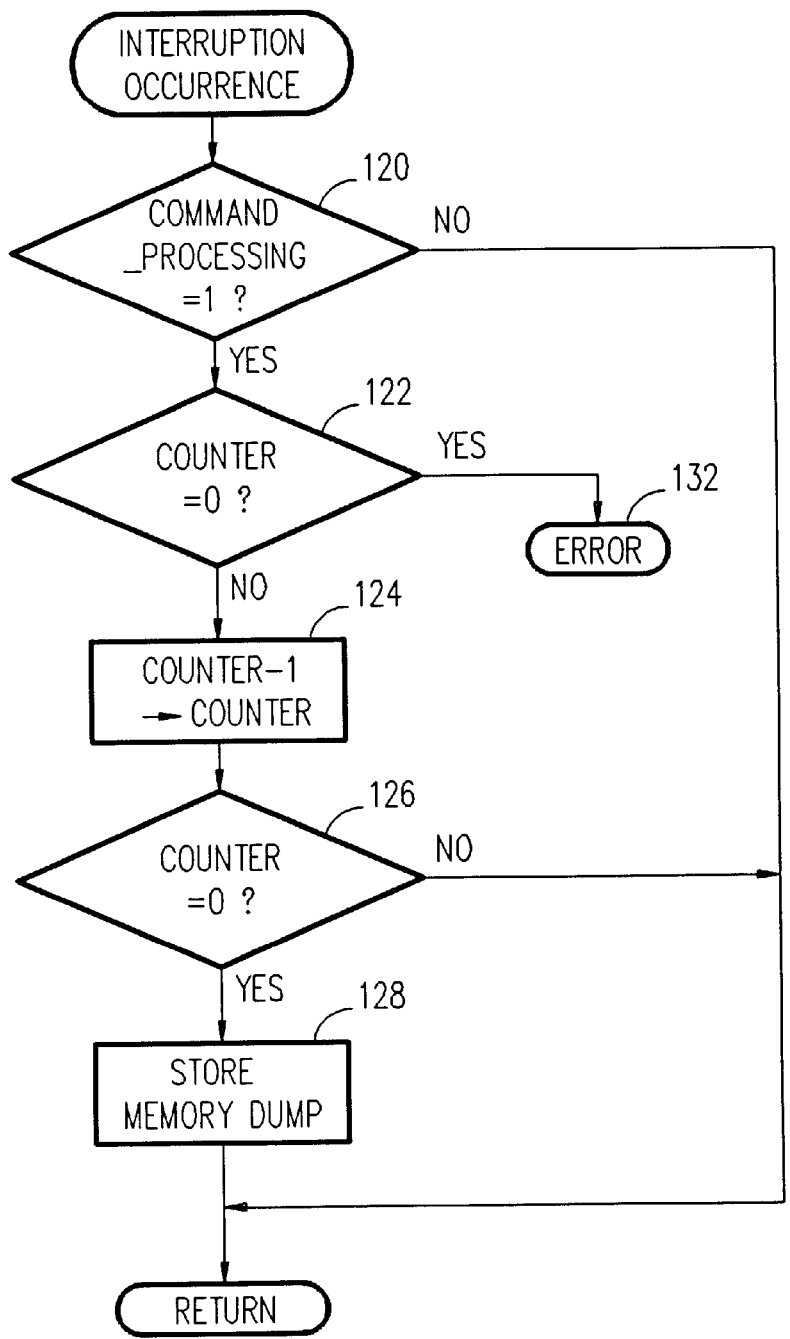
FIG. 3 is a flowchart showing a memory-dump storing process according to the present invention.

FIGS. 2 and 3 are flowcharts showing a process for realizing the aforementioned operation.

If the MPU 12 in FIG. 1 receives a command from the host equipment 10, it will start execution of the process shown in FIG. 2. First, in step 110 the MPU 12 sets an internal time-out value corresponding to a predetermined time (time-out checking time) previously set to a counter and performs initialization of the counter. The internal time-out value is set to the counter as a count value having, for example, a unit of 100 ms (for example, when the time-out checking time is 10 s, the internal time-out value is 100).

In step 112 the MPU 12 sets a COMMAND_PROCESSING flag to a 1 which represents that a command is being processed. The control section 5 in FIG. 1 is equipped with a timer which generates interruption with respect to the MPU 12 at predetermined intervals. When the COMMAND PROCESSING flag is set to 1, The control section 5 generates interrupt signals, for example interruptions at intervals of 100 ms. In response to an interrupt signal generated by the control section 5, the MPU 12 executes the process shown in FIG. 3.

In step 114 the MPU 12 monitors whether or not the processing of the command has been completed. If the processing of the command has not been completed, the MPU 12 will wait for completion of the process. If it has been completed, the MPU 12 will advance to step 116. In step 116, the MPU 12 sets the COMMAND_PROCESSING flag to a 0 which represents that a process is not being performed and ends the process shown in FIG. 2.

Generally, in disk drives, since a plurality of commands from the host equipment 10 are executed in parallel, the MPU 12 processes commands in parallel according to the steps shown in FIG. 2.

If during step 112 an interrupt is generated, the MPU 12 will execute a process shown in FIG. 3. In step 120, the MPU 12 determines whether or not the COMMAND_PROCESSING flag is set to a logic level 1. If the flag is set to a logic level 1, the MPU 12 advances to step 122 since a command is still being processed. If the flag is not set to a logic level 1, the MPU 12 ends the aforementioned interruption process because the processing of the command has been completed within the aforementioned time-out checking time. In this state, if interruption is performed again, the MPU 12 will execute step 120 and steps thereafter once again.

In step 122 the MPU 12 determines whether or not the value of the counter is 0. When the value of the counter is not 0, the time is within the time-out checking time and the MPU 12 advances to step 124. When the value of the counter is 0, the time-out checking time has already elapsed. Since a memory dump has been stored on the reserved area on the magnetic disk 1 when the last process was performed according to FIG. 3, the MPU 12 advances from step 122 to step 132. In step 132 the MPU 12 executes an error process.

In step 124 the MPU 12 subtracts 1 from the value of the counter. In step 126 the MPU 12 determines whether or not the counter value is 0. When the counter value is 0, it means that the processing of a command has not been completed within the time-out checking time. Therefore, the disk drive is considered to be in the hang state and the content of the RAM 14 (memory dump) is stored on the reserved area on the magnetic disk 1. On the other hand, if the value of the counter is not 0, the MPU 12 ends the process. In this case, if the predetermined time, i.e., 100 ms, elapses, interruption will be generated and the MPU 12 will execute step 120 and steps thereafter once again.

A process such as this is repeatedly executed for every predetermined time (i.e., 100 ms), and the counter value is reduced by 1 at a time. If the execution of a command is completed within the time-out checking time, in the aforementioned step 116 of FIG. 2 the COMMAND_PROCESSING flag will be set to logic 0. This means that the content of the RAM 14 need not be stored. In the case where the disk drive goes into a hang state, the processing of a command does not end within the time-out checking time. Therefore, after the time-out checking time, the MPU advances from step 126 of FIG. 3 to step 128. In step 128 the content of the RAM 14 is stored on the reserved area of the magnetic disk 1.

As described above, according to the present invention, the MPU 12 monitors the execution time of a command and if the execution of the command is not completed within a predetermined time, the content of the RAM 14 will be stored on the reserved area of the magnetic disk 1. Thus, according to the present invention, when the disk drive enters into a hang state, memory dump can be performed without requiring a command from the host equipment 10. Accordingly, even in the event that the disk drive goes into a full hang state and does not accept any command from the host equipment 10, the content of the RAM 14 can reliably be stored on the magnetic disk 1.

As mentioned above, the conventional method of storing the content of RAM 14 in a full hang state is to change the control board of the disk drive mounted with an HDC and an MPU to a control board equipped with an MPU connected with an in-circuit emulator. The disk drive is then operated to regenerate a similar hang stage and read out the memory content at that time.

On the other hand, in the present invention, the disk drive itself will record the content of the RAM 14 on the magnetic disk 1 if it enters into a hang state. Accordingly, the disk drive requires no exclusive hardware such as an ICE. For this reason, since the disk drive requires no place for installing the exclusive hardware and no preparation cost for the exclusive hardware, an analysis of the cause of the hang state can easily be performed.

If a customer's disk drive enters into a hang state, in most cases it is impossible to fetch an ICE. On the other hand, in the present invention, the disk drive itself records the content of the RAM 14, as discussed above, on the magnetic disk 1 if it goes to the hang state. Thus, the content of the RAM 14 can easily be accessed from the host equipment 10 after the disk drive is reset, for example. Therefore, the cause of the hang state can easily be analyzed without requiring any exclusive hardware such as an ICE.

Also, in cases where the control board itself is defective, if it is changed to a control board connected to an ICE, a similar hang state may not be regenerated. Even in a case such as this, the disk drive according to present invention records the content of the RAM 14 on the magnetic disk 1, so an analysis of the cause of the hang state can be performed.

In the aforementioned embodiment, while the magnetic disk 1 has been employed as a storage medium, the present invention is not limited to this embodiment. For example, the invention is also applicable to a disk drive where an optical disk, such as a magneto-optical disk, or a semiconductor storage device, such as a flash memory device, is employed as a storage medium.

Also, the disk drive can be constructed so that it can control the use or nonuse of a memory-dump storing function. If constructed like this, it can easily be switched whether or not the memory-dump storing function is employed. In addition, the disk drive may be constructed so that the time-out checking time is read out at the time of execution from the ROM 13 or a table which has been stored on a predetermined area on the magnetic disk 1. If constructed in this way, the time-out checking time can easily be changed as needed by changing the table.

Furthermore, in the aforementioned embodiment, although the execution time of a command is monitored by software, which is executed by the MPU 12, and also memory dump is stored by the software when the command process is not completed within the time-out checking time, a similar process may be executed by hardware separate from the MPU 12 (for example, an exclusive circuit, or another MPU in the case where a plurality of MPUs are employed). In this case, the cost may increase. However, even with problems occurring in the operation of the MPU 12 itself, memory dump can be stored and reliability can be enhanced. Moreover, many different embodiments of the present invention may be constructed without departing from the scope of the present invention.

ADVANTAGES OF THE INVENTION

According to the present invention, if time for executing a command received from external equipment exceeds a predetermined time, information in volatile memory will be stored in a nonvolatile storage means by at least one unit which performs data write and read back on a storage medium. Therefore, if the unit goes to a hang state, the information in volatile memory can be stored by that unit itself.

Therefore, even in the case where the unit has entered a hang state and could not be controlled by an external equipment, an analysis of the hang stage can easily be done without requiring any additional equipment, as it is required in the method of the prior art.

We claim:

1. A method of storing information, comprising the steps of:

receiving an externally generated command;
   monitoring execution time of said command; and
   storing information present in a volatile memory into a nonvolatile memory if the execution time of said command is equal to or greater than a predetermined time.

2. A method for preserving in a nonvolatile storage the information used during an operation of a device performing write and read-back operations on a storage medium, said information being present in a volatile storage during the operation of the device, said method comprising the steps of:

receiving an externally generated command;
   monitoring an execution time of said command; and
   storing said information in said volatile storage in the nonvolatile storage if the execution time of said command exceeds a predetermined time.

3. The method of claim 2, wherein said step monitoring step includes a step of measuring a time elapsed from the time of a reception of said command.

4. The method of claim 2, wherein said step monitoring step includes a step of measuring a time elapsed from a start of an execution of the command.

5. An information storing unit for storing in a nonvolatile storage an information used during operation of a device performing write and read-back operations on a storage medium, said information being present in a volatile storage during the operation of the device, the information storing unit comprising:

means for monitoring an execution time of an externally generated received command; and
   means for storing said information present in said volatile storage in the nonvolatile storage if the execution time of said command exceeds a predetermined time.

6. A disk drive comprising:

a disk-shaped storage medium;

at least one write/read-back unit for performing write and read-back operations on said storage medium;

a control unit for controlling write and read-back operations performed by said write/read-back unit;

volatile storage utilized by said control unit uses during operation of said write/read-back unit;

a nonvolatile storage;

means for monitoring an execution time of a write and read-back command; and means for storing information present in said volatile storage in said nonvolatile storage if the execution time of said command exceeds a predetermined time.

* * * * *